Figure 1:
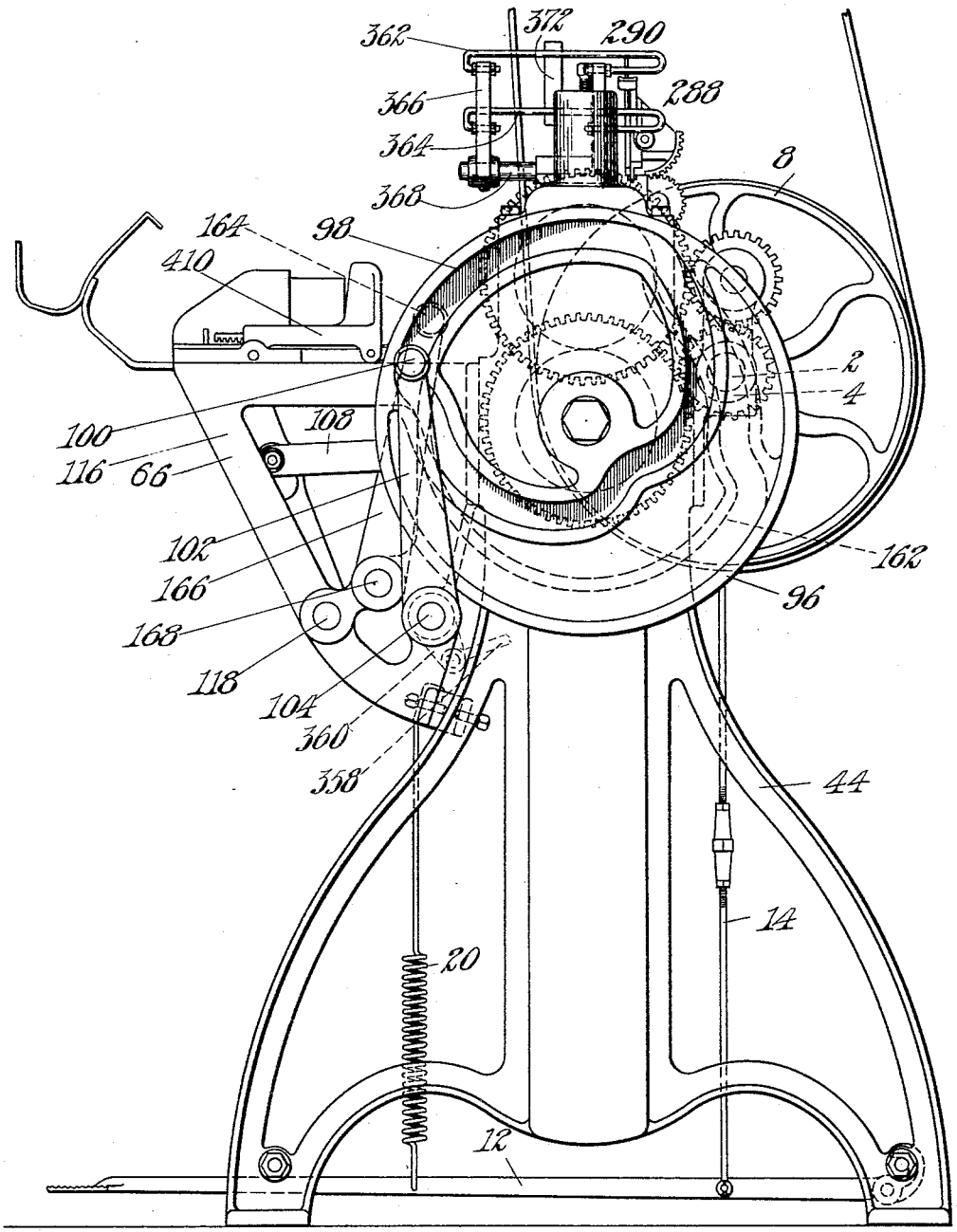

E. A. TRIPP.
MACHINE FOR SHAPING RANDS.
APPLICATION FILED NOV. 2, 1908.

1,115,037.

Patented Oct. 27, 1914.
11 SHEETS—SHEET 2.

WITNESSES
Allan H. Barrows
Bernard Barrows

INVENTOR
Eliphalet A. Tripp

E. A. TRIPP.
MACHINE FOR SHAPING RANDS.
APPLICATION FILED NOV. 2, 1908.

1,115,037.

Patented Oct. 27, 1914.
11 SHEETS—SHEET 3.

WITNESSES.
Allan H. Barrows.
Bernard Barrows

INVENTOR.
Eliphalet A. Tripp.

E. A. TRIPP.
MACHINE FOR SHAPING RANDS.
APPLICATION FILED NOV. 2, 1908.

1,115,037.  Patented Oct. 27, 1914.
11 SHEETS—SHEET 4.

WITNESSES  INVENTOR
Allan H. Barrows  Eliphalet A. Tripp
Bernard Barrows

E. A. TRIPP.
MACHINE FOR SHAPING RANDS.
APPLICATION FILED NOV. 2, 1908.

1,115,037.

Patented Oct. 27, 1914.
11 SHEETS—SHEET 6.

WITNESSES.
Allan H. Barrows.
Bernard Barrows

INVENTOR.
Eliphalet A. Tripp

E. A. TRIPP.
MACHINE FOR SHAPING RANDS.
APPLICATION FILED NOV. 2, 1908.

1,115,037.

Patented Oct. 27, 1914.
11 SHEETS—SHEET 7.

WITNESSES
Allan H. Barrows
Bernard Barrows

INVENTOR
Eliphalet A. Tripp

E. A. TRIPP.
MACHINE FOR SHAPING RANDS.
APPLICATION FILED NOV. 2, 1908.

1,115,037.

Patented Oct. 27, 1914.
11 SHEETS—SHEET 8.

WITNESSES
Allan H. Barrows
Bernard Barrows

INVENTOR
Eliphalet A. Tripp

E. A. TRIPP.
MACHINE FOR SHAPING RANDS.
APPLICATION FILED NOV. 2, 1908.

1,115,037.

Patented Oct. 27, 1914.
11 SHEETS—SHEET 9.

WITNESSES
Allan H. Barrows.
Bernard Barrows.

INVENTOR
Eliphalet A. Tripp.

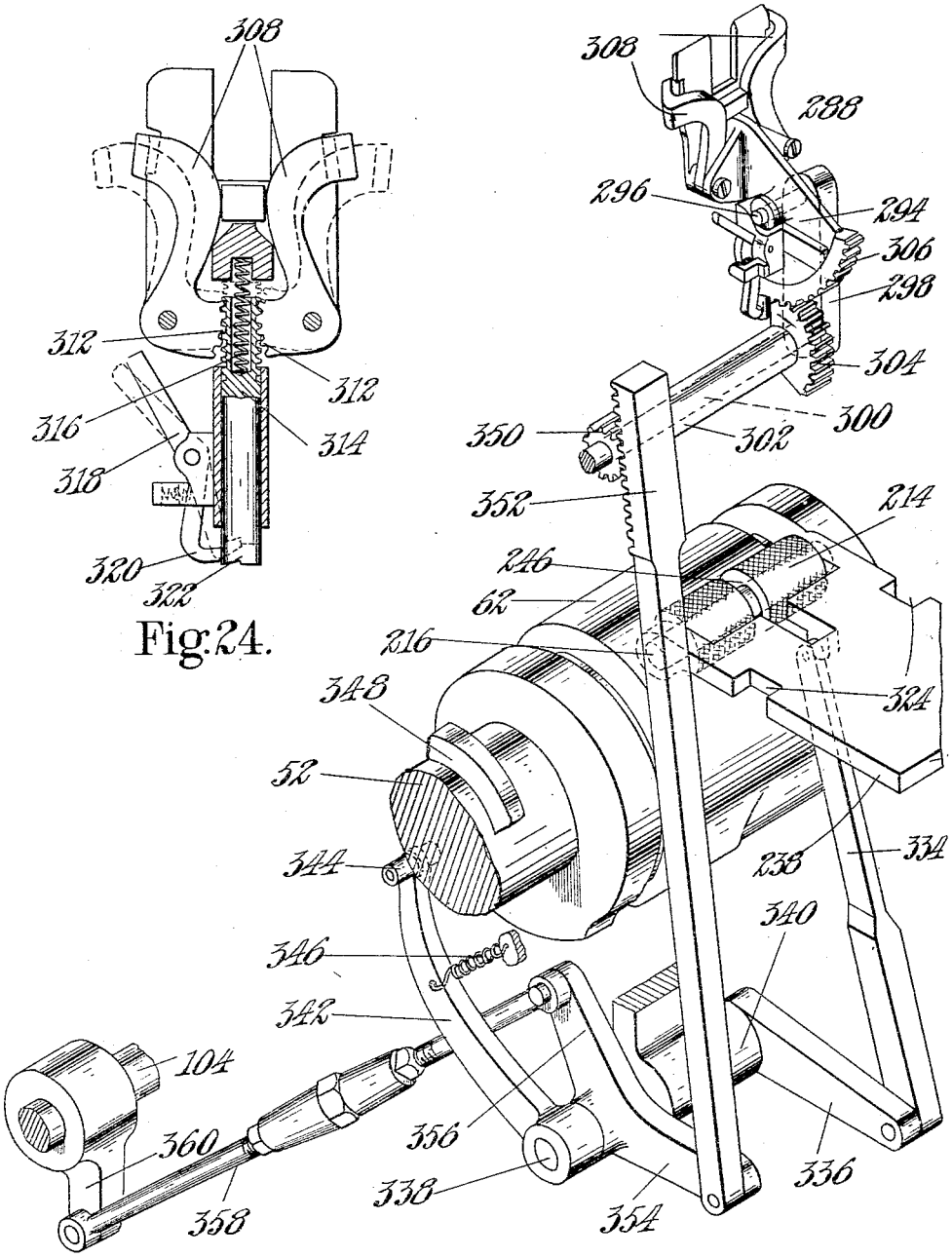

E. A. TRIPP.
MACHINE FOR SHAPING RANDS.
APPLICATION FILED NOV. 2, 1908.

1,115,037.

Patented Oct. 27, 1914.
11 SHEETS—SHEET 11.

WITNESSES
Allan H. Barrows
Bernard Barrows

INVENTOR
Eliphalet A. Tripp

UNITED STATES PATENT OFFICE.

ELIPHALET A. TRIPP, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR SHAPING RANDS.

1,115,037.  Specification of Letters Patent.  Patented Oct. 27, 1914.

Application filed November 2, 1908. Serial No. 460,727.

*To all whom it may concern:*

Be it known that I, ELIPHALET A. TRIPP, a citizen of the United States, residing at Beverly, in the county of Essex and Commonwealth of Massachusetts, have invented certain Improvements in Machines for Shaping Rands, of which the following description, in connection with the accompanying drawings, is a specification, like reference characters on the drawings indicating like parts in the several figures.

This invention relates to machines for imparting a predetermined shape to articles of leather, and more particularly to machines for giving rand strips a form adapted to permit them to be conveniently attached to heels.

As is well-known, rands used in the manufacture of boots and shoes are strips of leather which taper transversely to a thin edge. It is a common practice in the art to prepare the rands for the use for which they are intended by giving them approximately the curved contour which is their final shape when attached to heels. This is effected by bending the rand strip in the plane of the strip into a curved form adapted to facilitate its subsequent attachment.

The primary object of the present invention is to provide an efficient machine for imparting to rands a contour of this nature. The machine herein shown and described is constructed to bend the ends of a rand strip together in the plane of the strip and thereafter to flatten the corrugations formed upon the inner thin edge of the strip in the bending operation. Heretofore machines which have been designated to perform these two operations have been so constructed that the bending operation and the flattening or molding operation have been carried on at the same point in the machine and the devices for performing the two operations have had elements in common.

An important feature of the present invention consists in independent means for performing these two operations. By rendering the means for performing the bending operation independent of the means for molding the bent rand greater freedom is permitted in the choice of devices for performing the two operations than has been possible in prior machines. Not only is the quality of the work improved which is performed by the machine but also the machine is made considerably more rapid in its operation. While so far as the feature above referred to is concerned it would be within the present invention to employ any suitable means for performing the bending operation and any suitable means for performing the molding operation, the devices herein shown and described for performing these two operations respectively present a number of features of novelty. It will be understood that while these two sets of devices are broadly and specifically adapted for conjoint use they are not limited to such use.

The means for bending a rand strip preliminary to the molding operation comprises, in the machine shown, means for gripping a rand strip at a point adjacent its middle and formers positioned upon opposite sides of the gripping means and arranged for engagement with an edge of the strip. The gripping means and formers are arranged for relative movement to bend the ends of the strip toward each other and the formers are of such shape that in this movement the strip progressively bends into a shape suitable to permit of its application to the heel of a boot or shoe. According to a convenient construction the formers are arranged on a support upon which the rand strip rests in the bending operation and the gripping means is arranged to automatically grip the strip and to advance it laterally against said formers with its thick edge foremost so that the strip is bent into a substantially U shape as it advances between the formers. In order to prevent distortion of the rand in the bending operation there is provided a presser which is mounted upon the support and provided with an acting surface arranged between the formers and adapted to bear upon the top surface of the rand and press it against the support in said bending operation. The presser is preferably arranged to be automatically raised from engagement with the top surface of the rand to facilitate withdrawal of the bent rand from the rand bending mechanism.

It is sometimes desirable in forming rands that the ends of the rands be bent quite close together in the bending operation. In one embodiment of the invention this result is effected by arranging the rear ends of the formers for automatic approaching movement as the ends of the rand move between said rear ends of the formers. This movement is arranged to take place after the presser has been raised from engagement with the top surface of the rand to avoid any interference between the formers and presser.

The molding mechanism herein shown comprises a die roller and a presser roller arranged to coöperate in molding a substantially U-shaped rand. The die roller is provided with a cavity arranged to receive a rand that is fed to the rollers with its rounded end foremost. The cavity in the die roller is of such form that the corrugations upon the inner or thin edge of a U-shaped rand within the cavity are progressively smoothed out as said rand passes between the rollers. By the provision of this cavity the ends of the rand are prevented from springing apart during the molding operation so that the rand is molded in the shape that has been given to it by the rand bending mechanism. According to a preferred construction the presser roller is yieldingly held toward the die roller with such pressure that the corrugations upon the inner edge of a bent rand may be smoothed out without imparting an excessive pressure to the edges of the rand.

To effect the automatic delivery of the bent rand to the molding mechanism the support which sustains the formers and presser is in the form of a carriage and is arranged for movement to deliver the rand to the rollers. After the rand has been bent into a substantially U shape the gripping means is arranged to release the rand automatically and thereafter the carriage is automatically moved to present the rounded end of the rand to the rollers at such time that said rand will be received within the cavity in the die roller. By presenting the rands to the rollers with their rounded ends foremost a more uniform and perfect presentation is effected than would otherwise be the case.

A further feature of the invention comprises a magazine for receiving the bent rands and a transferrer arranged to receive a finished rand and automatically deliver it to the magazine. As in the machine herein disclosed the rands are subjected to a molding operation after they are bent into U shape, the transferrer is arranged to receive a molded rand from the molding mechanism, and deliver it to the magazine. It is, however, within the present invention to provide a machine for forming rands in which a transferrer is arranged to receive a rand directly from a rand bending mechanism and deliver it to a magazine. In the embodiment of the invention herein described the molded rand is received upon a table and the transferrer is provided with jaws arranged to automatically grip the rand upon opposite sides and transfer it to the magazine which is preferably arranged upon the upper part of the machine.

Although the construction of machines embodying the present invention may be such that rand strips may be fed directly to the rand bending mechanism, yet the invention is further concerned with means which is arranged to receive a rand strip and deliver it to the rand bending mechanism. To this end in the present embodiment of the invention there is provided a carrier which is arranged for movement between a receiving position, in which the operator may conveniently supply it with a rand strip, and a position in which it automatically delivers the rand strip to the gripping means of the rand bending mechanism. The construction is preferably such that the strip is stretched longitudinally as the carrier moves toward its delivering position in order that any wrinkles which may have formed in the strip may be smoothed out before it is delivered to the gripping means.

In addition to the features of invention above described, the present machine embodies certain novel features of construction and arrangement of parts, the advantages of which will be obvious to those skilled in the art from the following description.

Figure 2:
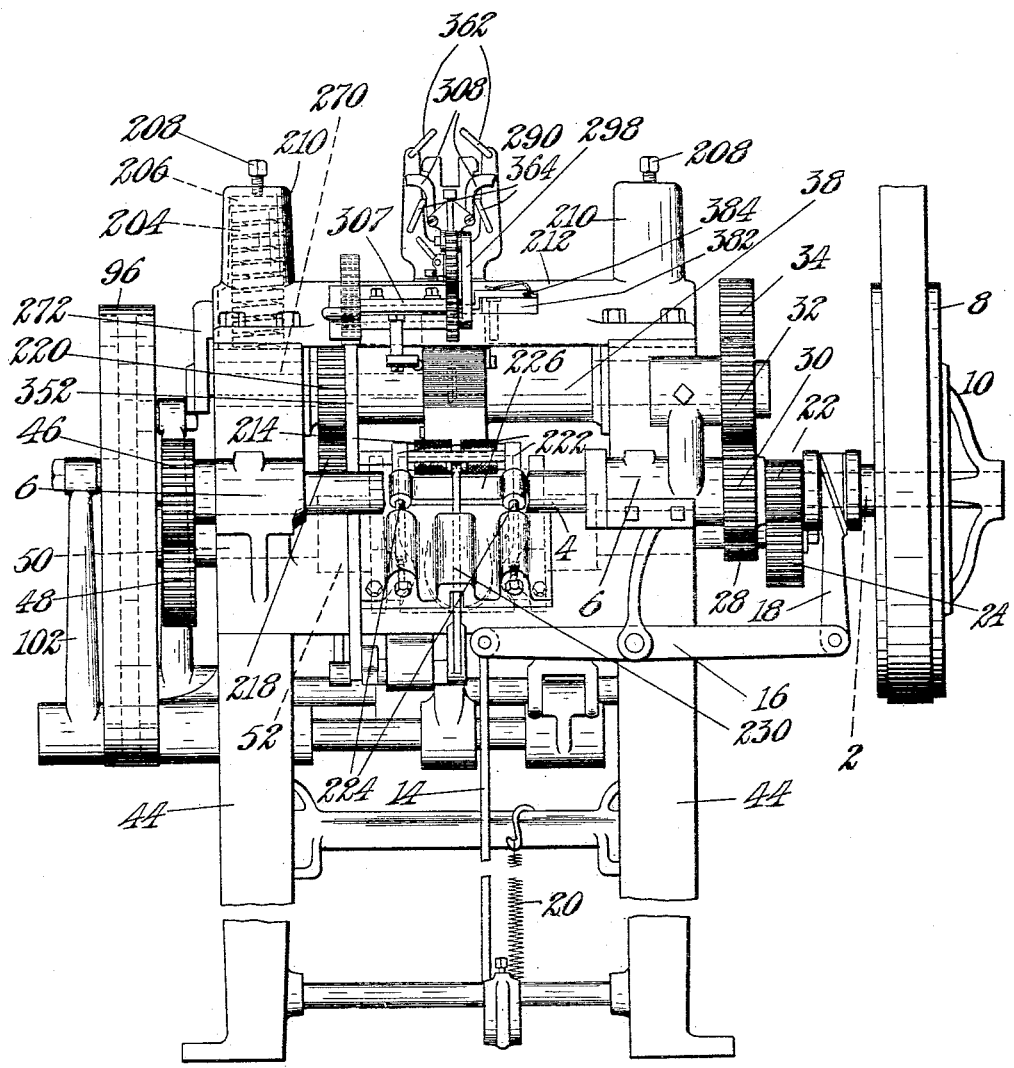
Figure 3:
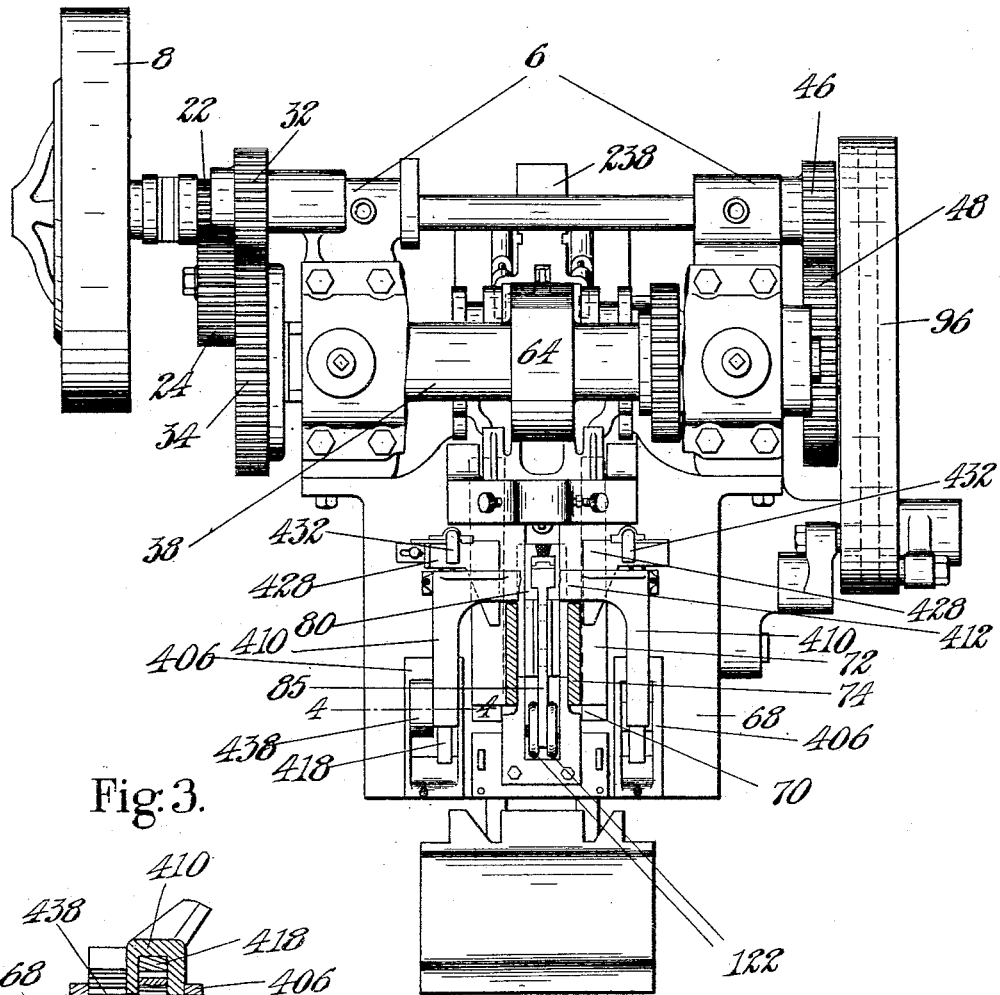
Figure 4:
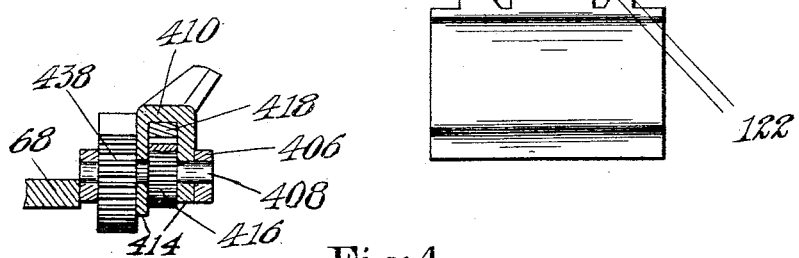
Figure 5:
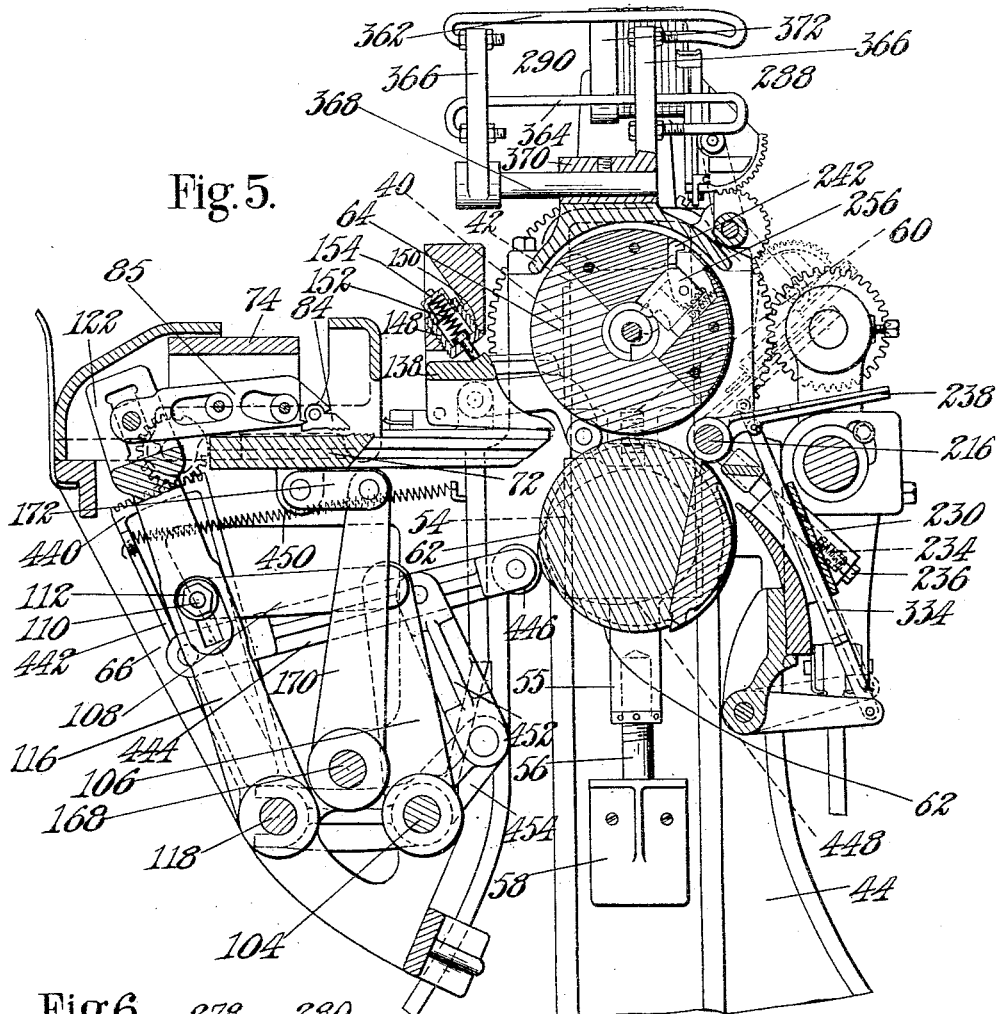
Figures 6, 7:
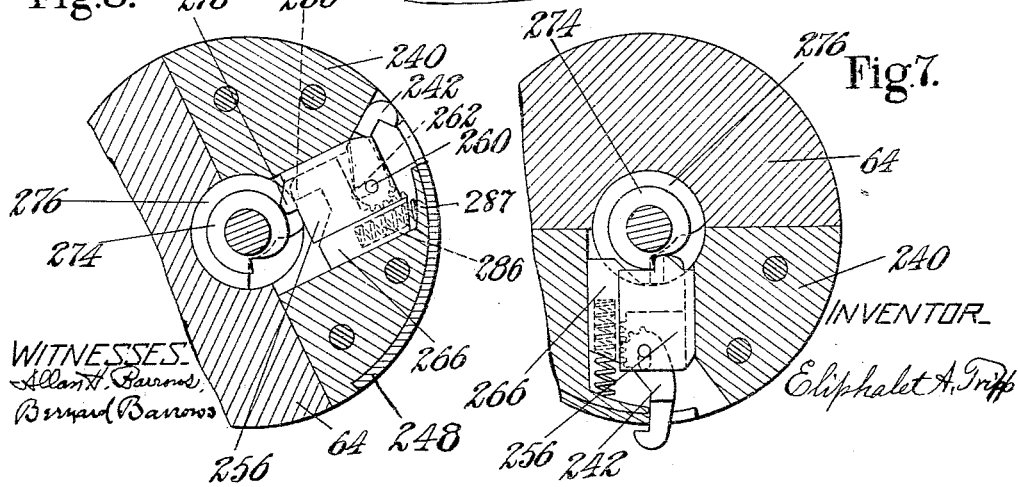
Figure 8:
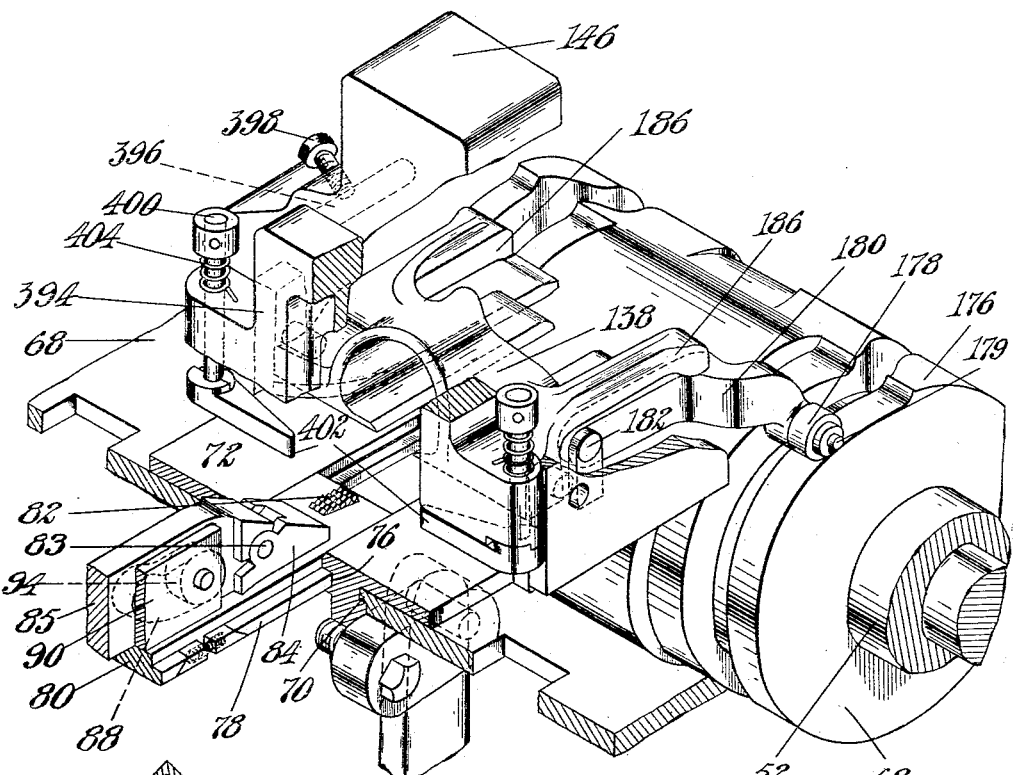
Figure 9:
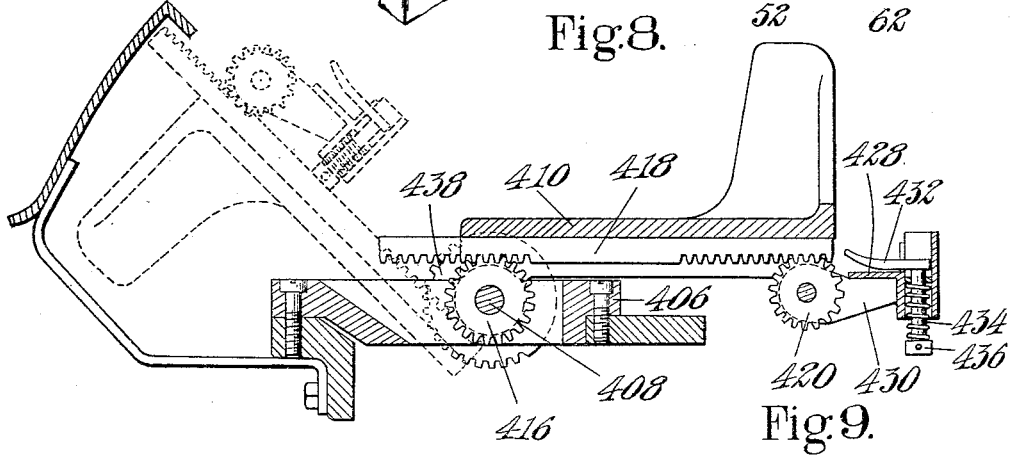
Figure 10:
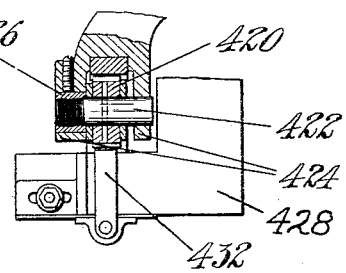
Figure 11:
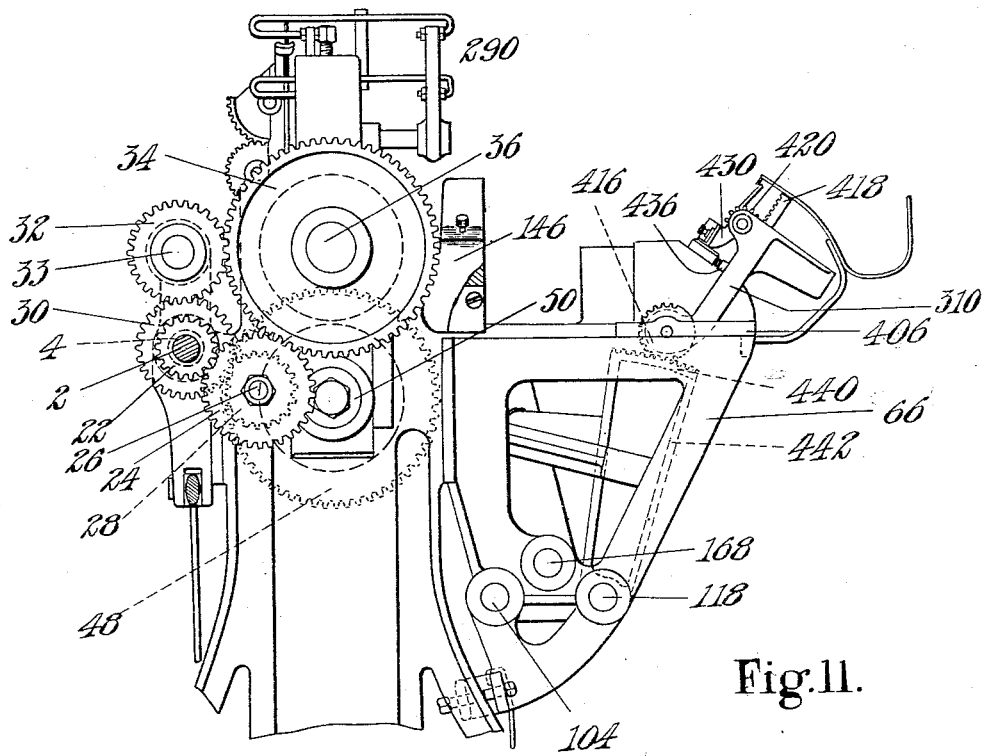
Figure 12:
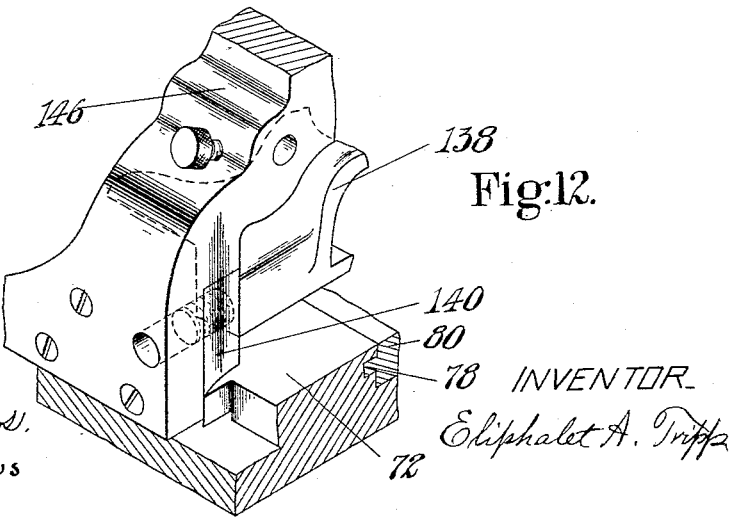
Figure 13:
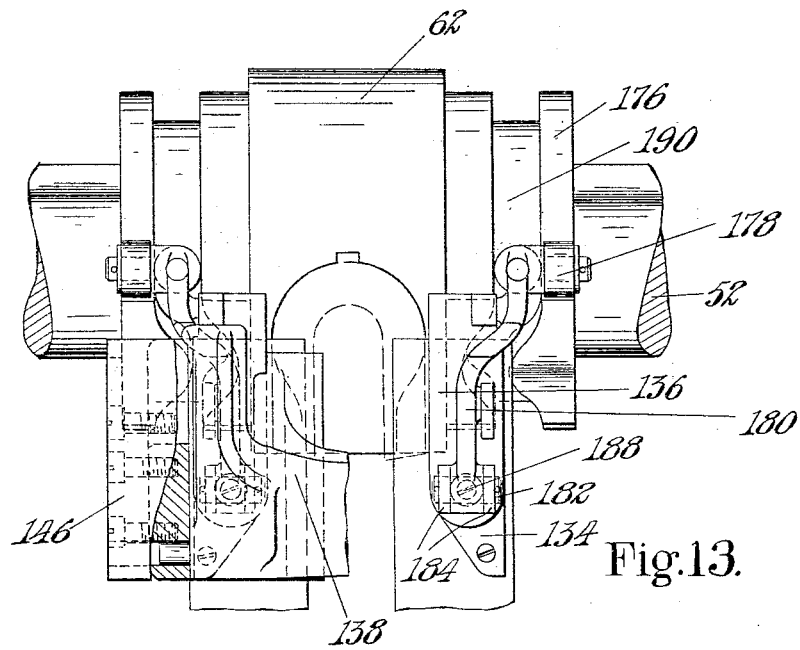
Figure 14:
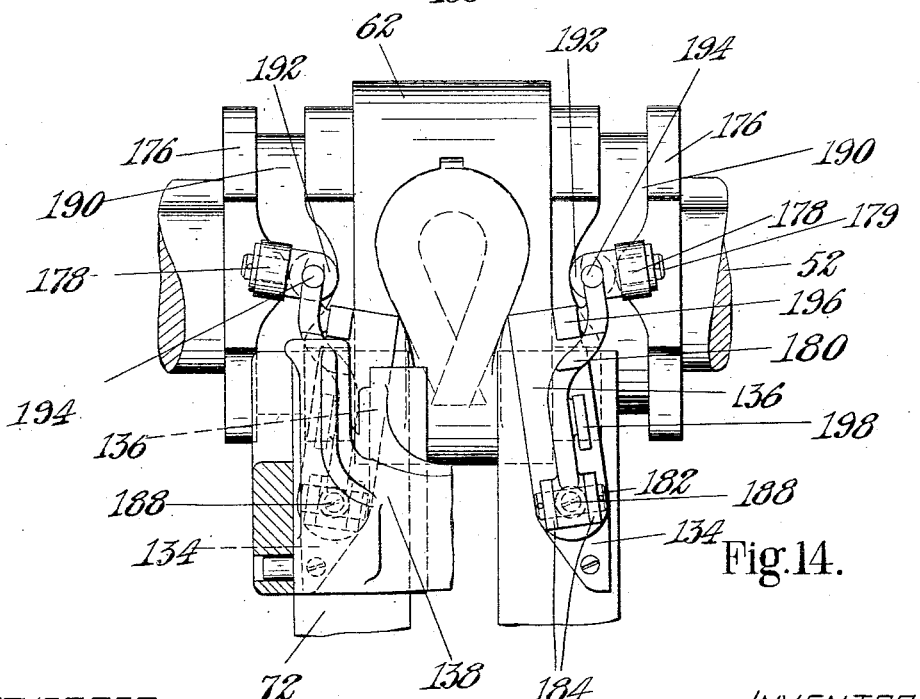
Figures 15, 16:
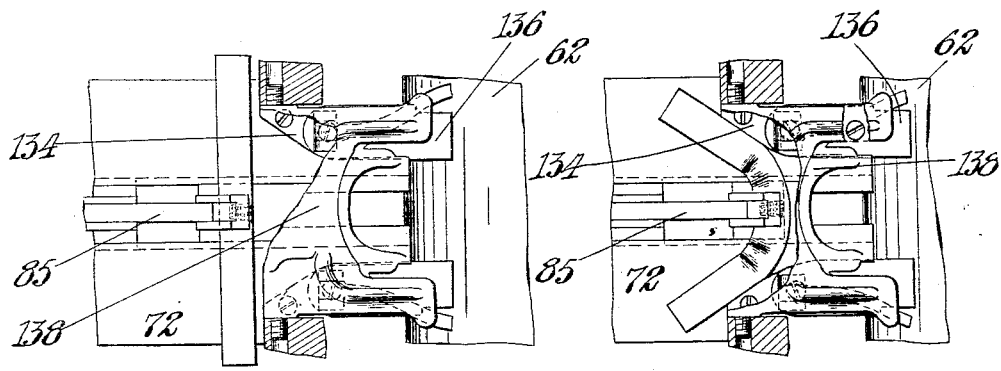
Figures 17, 18:
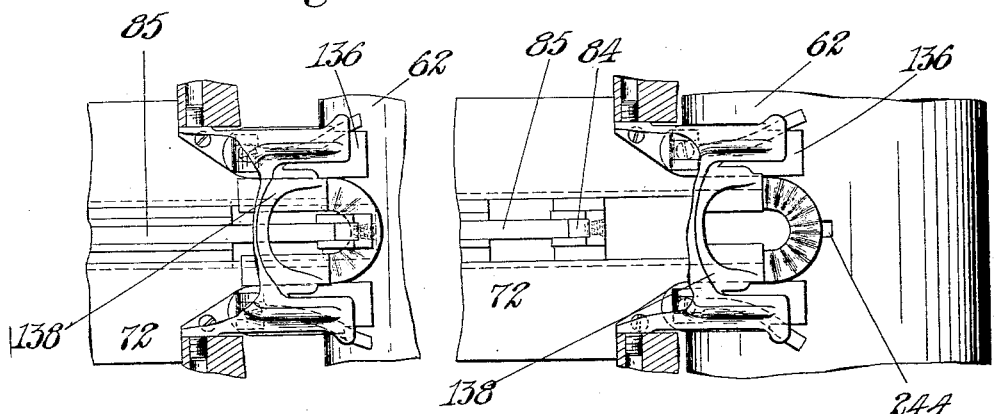
Figures 19, 20:
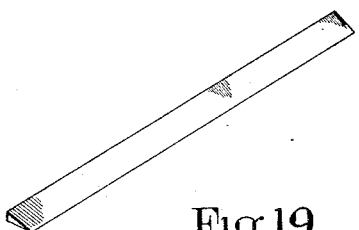
Figure 21:
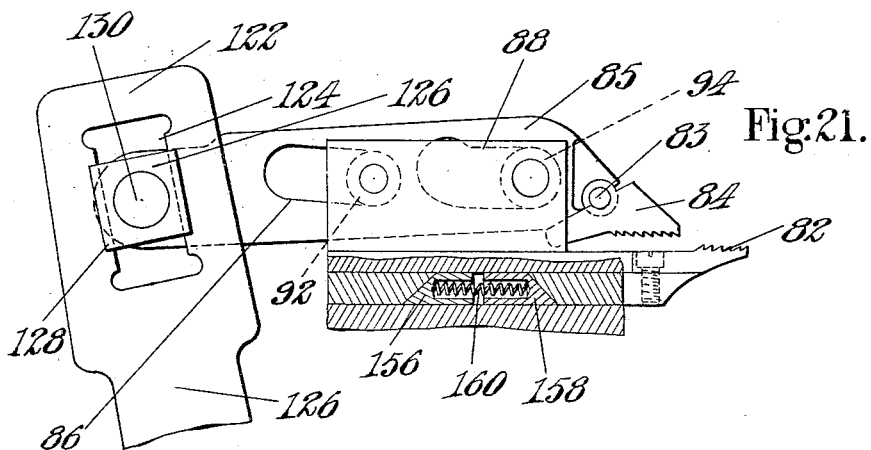
Figure 22:
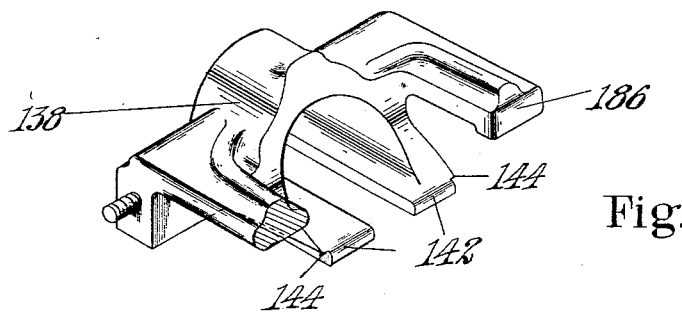
Figure 23:
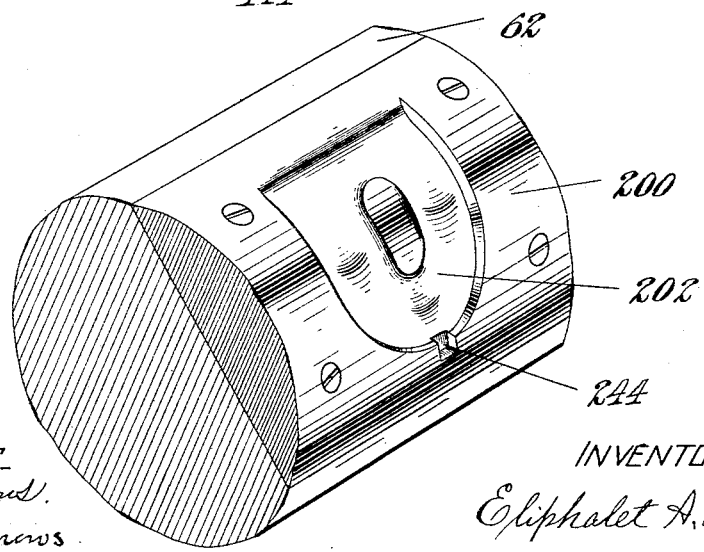
Figure 26:
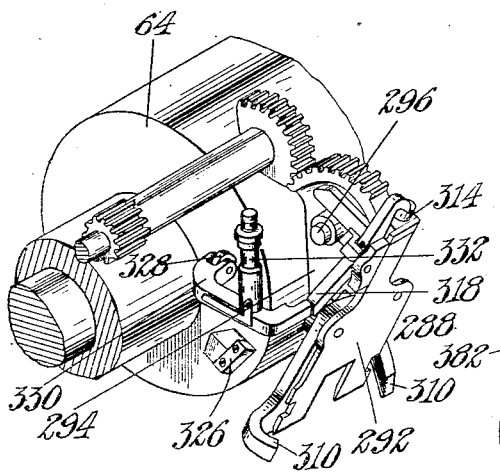
Figure 27:
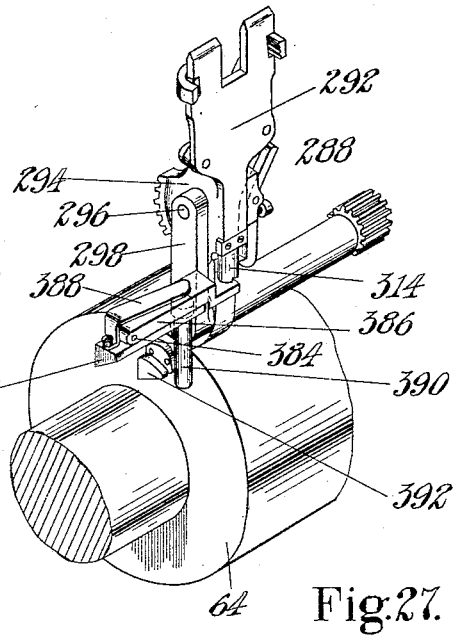
Figure 28:
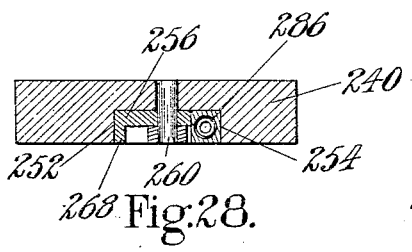
Figure 29:
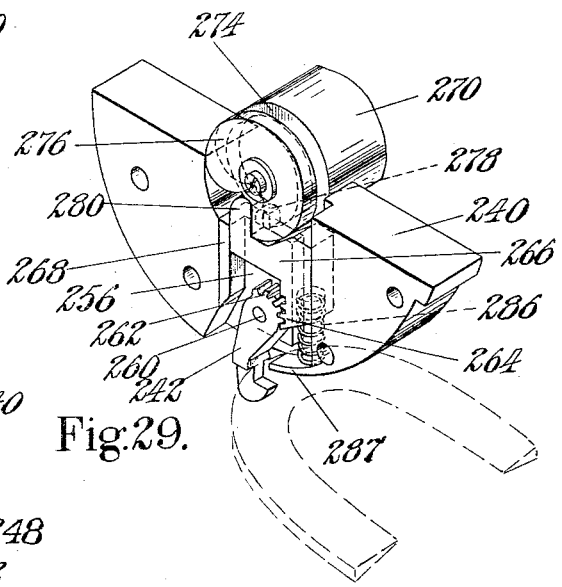
Figure 30:
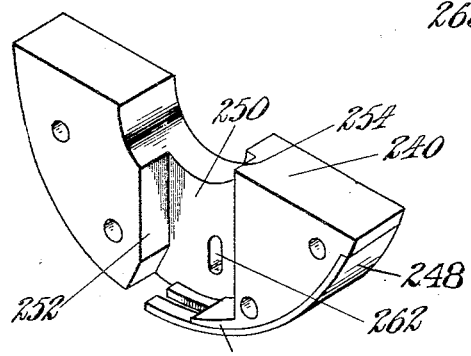

In the drawings,—Figure 1 is a view in side elevation of a machine embodying the present invention; Fig. 2 is a rear elevation of the machine shown in Fig. 1; Fig. 3 is a plan view of a portion of the machine; Fig. 4 is a sectional view taken on the line 4—4 of Fig. 3; Fig. 5 is a sectional view taken on a line extending centrally from front to rear of the machine; Figs. 6 and 7 are sectional views of the presser roller showing the hook-shaped member and its actuating mechanism; Fig. 8 is a view in perspective of a portion of the machine; Fig. 9 is a sectional view of the carrier; Fig. 10 is a detail view partly in section of the carrier; Fig. 11 is a view in side elevation showing the carrier in its receiving position; Fig. 12 is a perspective view of a portion of the machine showing the construction by which the bridge and presser are secured in their operative positions; Fig. 13 is a plan view of a modified portion of the machine showing the rear ends of the formers in their outer positions; Fig. 14 is a view similar to Fig. 13 showing the rear ends of the formers after they have been moved toward each other to bend the ends of the rand close together; Figs. 15, 16, 17 and 18 are plan views showing a rand in different stages of the bending operation; Fig. 19 is a perspective view of a rand strip, and Fig. 20 is a perspective view of a U-shaped rand; Fig. 21 is a view partly in section showing a detail of construction; Fig. 22 is a perspective view of the presser; Fig. 23 is a perspective view of a portion of the die roller showing the removable matrix; Fig. 24 is a view partly in section of the transferrer; Fig. 25 is a view in perspective of the transferring mechanism and its actuating means; Fig. 26 is a view in perspective of the transferrer in its inclined rand receiving position, showing the mechanism for tripping the catch of said transferrer; Fig. 27 is a perspective view of the transferrer in its vertical or rand delivering position, showing the mechanism for opening the arms of the transferrer; Fig. 28 is a view in cross-section of the removable section which carries the hook-shaped member taken on a line extending through the pivot of said hook-shaped member in a direction at right angles to that radius of the presser roller which extends through said pivot; Fig. 29 is a view in perspective of the hook-shaped member and its actuating mechanism; and Fig. 30 is a perspective view of the removable section which carries the hook-shaped member.

Referring to the drawings, 2 designates the power shaft which is journaled within a tubular shaft 4 rotatably mounted in bearings 6 supported upon the frame of the machine. A driving pulley 8 is supported upon the end of the shaft 2 and is arranged to be clutched thereto by a clutch mechanism 10 which may be of any suitable construction. The clutch mechanism is arranged to be thrown into operation by a treadle 12 which is connected by a link 14 with one end of a lever 16 pivotally sustained intermediate its ends upon the frame of the machine. The other end of the lever 16 is connected with a link 18 which is arranged to control the operation of the clutch mechanism. A spring 20 extending between the frame of the machine and the treadle tends to hold the clutch mechanism in its inoperative position. A gear 22 fast upon the power shaft 2 meshes with a larger gear 24 journaled upon a stud 26 extending from the frame of the machine. A small gear 28 also journaled upon the stud 26 and arranged to rotate with the gear 24 meshes with a gear 30 secured upon one end of the tubular shaft 4. The gear 30 meshes with an idler 32 which is journaled upon a stud 33, extending from the frame of the machine, and is arranged to drive a large gear 34 secured upon the outer end of one of the trunnions 36 of a roller shaft 38 that is horizontally mounted in the upper part of the machine in bearing blocks 40, Fig. 5, which are respectively arranged in vertical guideways 42 formed in the side members 44 of the frame of the machine. Upon the other end of the tubular shaft 4 is secured a gear 46 of the same size as the gear 30 arranged to mesh with a gear 48, which is equal in size to the gear 34, and is secured upon the outer end of one of the trunnions 50 of a second roller shaft 52 that is horizontally mounted beneath the roller shaft 38 in bearing blocks 54 arranged in the guideways 42. The lower bearing blocks 54 are provided with depending tubular members 55 in which the upper ends of rods 56 are respectively secured by threaded engagement. The lower ends of the rods 56 rest upon brackets 58 respectively secured to the side members 44 and said rods 56 are constructed to be adjusted to properly locate the position of the lower roller shaft. In each of the upper bearing blocks 40 is threaded a bolt 60 arranged to respectively engage the upper surface of the corresponding lower blocks 54 to limit approaching movement of the blocks and formed to be adjusted to permit the normal distance between the roller shafts to be varied. The roller shafts 52 and 38 carry respectively a die roller 62 and a presser roller 64, to be hereinafter more particularly described, between which a bent rand may be molded as it passes between the rollers.

Upon the side members 44 of the machine is secured a bracket 66 which carries a flat horizontal bed 68. Formed in the sides of an opening extending from front to rear of the bed are ways 70 upon which a carriage 72 having a flat upper surface is mounted to slide, Figs. 3 and 8. A rectangular opening extends from the front of the carriage to its rear and the two sections thus formed are united by an arch-shaped member 74 which extends over the opening at its front portion. In the two sides of the rectangular opening are formed grooves 76 which receive respectively the tongues 78 which project from opposite sides of a slide 80. The slide 80 is provided with means for gripping a rand at a portion adjacent its middle and is arranged to advance the rand along the carriage with its thick edge foremost. In the construction herein shown the slide is provided with corrugations 82 upon which the middle portion of a rand may rest and a corrugated gripper 84 is arranged to come down upon the rand and clamp it in engagement with the slide and thereafter to advance the rand and slide along the carriage. The corrugated gripper 84 is pivotally mounted intermediate its ends upon a pin 83 extending transversely of the inner end of a gripper bar 85 which extends longitudinally of the slide and is provided with a guide slot 86 and a cam slot 88, Figs. 8 and 21.

Extending upwardly from the slide upon opposite sides of the gripper bar are two plates 90 between which are journaled a guide roller 92 and a cam roller 94 which respectively enter the guide slot 86 and the cam slot 88 of the gripper bar. The cam slot 88 is so shaped that as the gripper bar is moved toward the rear of the machine the gripper 84 is forced down upon a rand that is supported upon the carriage with its middle portion resting upon the corrugations on the slide. After the rand has been clamped in engagement with the slide by the gripper 84 further movement of the gripper bar causes the rand and the slide to be moved toward the rear of the machine. With this construction it will be seen that as the force for advancing the rand is transmitted through the means for clamping the rand in position upon the slide the rand is gripped with a pressure that is proportionate to the resistance offered to the movement of the slide.

The gripper bar 85 is arranged to be automatically actuated to advance the rand and thereafter to be retracted by means of a cam disk 96 which is secured upon one end of one of the trunnions 50 of the lower roller shaft 52. To this end a cam slot 98 formed in the outer face of the disk receives a cam roller 100 carried by the upper end of a lever 102 which is secured at its lower portion to one end of a rock-shaft 104 that is horizontally arranged in bearings formed in the bracket 66. The lower end of a lever 106, Fig. 5, is secured upon the shaft 104 at its central portion, and a link 108 has one end pivotally connected with the lever 106 and its other end carries a stud 110 adapted to be clamped in adjusted position by a nut 112 in a slot formed in the middle portion of a lever 116 that is secured at its lower end upon a horizontal rock-shaft 118 journaled in bearings formed in the bracket 66. The upper end of the lever 116 carries two ears 122, Fig. 21, which are provided with longitudinal slots 124 adapted to respectively receive blocks 126 that are formed to slide in the slots and provided with flanges 128 adapted to engage the outer surface of the ears 122. The outer end of the gripper bar 85 is pivotally sustained between the blocks 126 by a pin 130 which extends through the gripper bar and said blocks. As will appear from an inspection of Fig. 1, the cam slot 98 is so formed that the gripping means remains in its forward or rand-receiving position for a time corresponding to that required for about ⅓ of a revolution of the cam disk 96, so that sufficient time is allowed to feed a rand strip to the gripping means before the latter starts on its rearward movement.

To cause the ends of the rand strip to be bent together as the strip is advanced along the carriage, formers are positioned on the carriage upon opposite sides of the slide and arranged to be engaged by an edge of the strip. The formers extend longitudinally of the carriage and are of a thickness a little greater than the thickness of the rand and are provided with rand-engaging surfaces formed and arranged to cause the rand strip to progressively bend into a substantially U shape as it is advanced between the formers. In the machine herein disclosed, the formers are made in two sections. As shown in the drawings, the forward section 134 has a rand-engaging surface extending at an angle of substantially 45° with the line of movement of the rand and the rear section 136 has a rand-engaging surface substantially parallel with the line of movement of said rand. In the embodiment of the invention illustrated in Figs. 15 to 18 inclusive, the sections of the formers are rigidly secured to the carriage as by machine screws extending through said sections into the carriage.

In order to prevent distortion of the rand in the bending operation, there is provided a presser 138 which has a flat acting surface adapted to bear upon the top surface of a rand in said operation. The presser 138 is arranged between two vertical plates 140 which are integral with the carriage and arranged longitudinally thereof upon its opposite sides outside of the formers. The forward end of the presser 138 is pivotally sustained between the plates 140 in such manner that the forward part of the acting surface is positioned above the carriage a distance somewhat greater than the thickness of the rand. As shown in Figs. 8 and 22 the acting portion of the presser comprises rand-engaging parts 142 which are positioned between the formers and upon opposite sides of the line of movement of the gripper 84. An opening extends through the presser which is arranged to permit the gripper 84 to pass between the parts 142 in the rand-bending operation. Extending from the upper part of the outer edge of the parts 142 are flanges 144 which are respectively adapted to bear upon the top surfaces of the sections 136 of the formers to limit the downward movement of the presser when a rand is not beneath said presser. A bridge 146 is arched over the presser and its two ends are provided with horizontal shoulders which rest upon the upper surface of the plates 140, as shown in Fig. 12. The ends of the bridge 146 are secured to the plates 140 as by means of machine screws extending through said ends into said plates. A thimble 148 is secured in an opening formed in the upper central portion of the bridge and is arranged with its closed end in proximity to the upper surface of the presser. A headed pin 150 having its shank extending through an opening in the end of the thimble is arranged with its lower end in engagement with the upper surface of the presser, and a spring 152 extending between the head of the pin and a cap 154 screwed into the open end of the thimble serves to yieldingly hold the acting parts 142 of the presser in engagement with the top surface of the rand during the bending operation.

After the completion of the rand-bending operation the gripping means is arranged to automatically release the rand during an initial portion of the retraction of the gripper bar. There is accordingly provided means for preventing the slide 80 from immediately following the gripper bar when the latter is retracted so that the relative movement thus obtained between the slide and gripper bar will cause the inner end of the gripper bar to be raised through the medium of the cam slot 88 and cam roller 94 and thus raise the gripper 84 from engagement with the rand. To prevent the slide from immediately following the gripper bar there is provided means for frictionally resisting the movement of the slide in the guideways formed in the carriage. To this end a portion of one of the tongues 78 is cut away by diagonal cuts as shown in Figs. 8 and 21, and in the recess thus formed are arranged two blocks 156 and 158 which are held apart by a spring 160 and are provided with end surfaces that are respectively parallel with the diagonal surfaces of the said tongue. With this construction, it will be seen that the spring 160 tends to wedge the tongue upwardly against the upper surface of the groove 76 and to force the blocks against the lower surface of said groove whereby a frictional resistance is offered to the movement of the slide. It will be seen in the present construction since, as previously explained, the gripping mechanism is constructed to grip a rand strip with a pressure proportionate to the resistance that is offered to the forward movement of the strip that the provision of means for frictionally resisting the forward movement of the slide insures that the strip will be more firmly gripped during its advance movement than would otherwise be the case.

After the gripping means has released the rand, the carriage is arranged to be automatically advanced to present the rounded end of the bent rand to the rollers 62 and 64. To effect this movement of the carriage a cam slot 162, formed upon the inner side of the cam disk 96, receives a cam roller 164 mounted upon the upper end of a lever 166 which is secured at its lower end to a rockshaft 168 that is horizontally journaled in bearings formed in the bracket 66. A lever 170 is secured at its lower end to the rockshaft 168 and its upper end is connected by a link 172 to a projection depending from the carriage 72. As indicated in Fig. 1 of the drawing the cam slot 162 is so formed that the carriage remains stationary during the rand-bending operation and upon the completion of said operation and after the gripping means has released the rand the carriage is advanced to present the rounded end of the rand to the rollers 62 and 64 and is thereafter moved back to its original position.

To facilitate the delivery of the bent rand to the rollers, the presser 138 is arranged to be automatically raised from engagement with the top surface of the rand as said rand is being grasped by said rollers. To this end in the present machine, cam surfaces 176, Fig. 8, formed upon the opposite ends of the roller 62 are engaged by cam rollers 178 mounted upon horizontal studs 179 extending outwardly from the ends of levers 180 that are pivoted at their opposite ends about horizontal studs 182 secured between ears 184 which respectively extend upwardly from the sections 136 of the formers and are rigidly secured thereto. The presser 138 is provided upon opposite sides with projections 186 which respectively extend over the levers 180 and are in contact therewith whereby upward movement of the levers 180 under the influence of the cam surfaces 176 will swing the presser upwardly about its point of pivotal support. The cam surfaces 176 are so formed that in the rand-bending operation the spring 152 is allowed to hold the presser in yielding engagement with the top surface of the rand. Upon the completion of this operation, and after the advance movement of the carriage has taken place, the presser is raised to facilitate the delivery of the rand to the rollers 62 and 64 and thereafter the presser is returned to its lower position.

In the modification shown in Figs. 13 and 14, the sections 136 of the formers are constructed and arranged to automatically approach each other as the rand is being fed to the rollers 62 and 64 in order that the two ends of the rand may be bent quite close together before said ends pass between the rollers. According to a convenient construction the sections 136 are pivoted at their forward ends upon vertical studs 188 secured in the carriage 72. The forward ends of the sections 136 are curved in convex form and have centers of curvature which respectively coincide with the centers of the studs 188. The rear ends of the sections 134 are formed to fit the forward ends of the sections 136 whereby pivotal movement of the sections 136 is permitted about the studs 188 as centers. To move the rear ends of the sections 136 toward each other cam slots 190 are formed in the opposite ends of the roller 62 and arranged to receive cam rollers 192 mounted upon vertical studs 194 secured in the ends of the levers 180. Each of the sections 136 is provided with upwardly extending projections 196 and 198 arranged to have engagement with the opposite sides of one of the levers 180. With this construction it will be seen that lateral swinging movement of the levers 180 is imparted to the sections 136 and at the same time said levers are adapted to have an independent vertical swinging movement about the studs 182 to raise the presser from engagement with the top surface of the rand in the manner previously described. The relative timing of the cams which raise the presser and the cams which move the sections 136 of the formers together is such that the acting parts 142 of the presser are raised from the path of the sections 136 prior to the approaching movement of said sections. The cam slots 190 are so formed that in the initial part of the rand bending operation the sections 136 remain as shown in Fig. 13, substantially parallel with the line of movement of the rand. After the presser has been raised so that its acting parts 142 are removed from the path of the sections 136, and as the rounded end of the rand is seized by the rollers 62 and 64 the sections approach each other to bend the two ends of the rand together. If desired the approaching movement of the sections 136 may be of a sufficient extent to cause the two ends of the rand to overlap each other in the manner shown in Fig. 14 of the drawings. The form of the cam slots 190 is further such that after the ends of the rand have passed between the rollers the sections 136 are moved away from each other to their original positions.

The lower roller 62 is provided with a removable matrix 200 in which is formed a die cavity 202 which is substantially the shape of a U-shaped rand. The matrix 200 is so arranged in the roller that when the carriage 72 advances to deliver a rand to the rollers with its rounded end foremost said rand will be received within the die cavity in said matrix. As the rotary movement of the lower roller 62 is correlated with the movement of the carriage 72 by means of the mechanism previously described, it will be noted that the rounded end of the rand will always be presented to the rollers at such time that the rand will be received within the matrix in the lower roller.

As shown in Fig. 23 the cavity 202 progressively increases in depth from its middle portion to its sides and curved end in such manner that the inner or thin edge of a rand within the cavity may be subjected to the molding action of the rollers whereby the corrugations which are formed in said edge in the rand-bending operation may be progressively smoothed out as the rand passes between the rollers and thus insure that the rand will remain in the form that has been given to it by said bending mechanism.

In the present machine the upper roller is held yieldingly toward the lower roller. For this purpose springs 204 (Fig. 2) are interposed between the bearing blocks 40 and disks 206 secured upon bolts 208 that are adjustably secured in the tops of casings 210 arranged upon opposite sides of the top plate 212 which is bolted to the side members 44 of the machine. With this construction the amount of pressure with which the two rollers are yieldingly held together may be such that the corrugations upon the inner edge of a bent rand may be smoothed out without an excessive pressure being imparted to the edges of the rand such as would decrease the thickness of the rand. Furthermore it will be noted that where the pressure is yieldingly applied in the molding operation it does not materially vary with rands of different thicknesses. In this respect the present machine is an improvement upon prior devices in which the pressure has been applied positively to perform the molding operation so that these devices have not been adapted to mold rands of different thicknesses with a substantially uniform pressure.

A corrugated roller 214, Figs. 2 and 25, is supported upon a shaft 216 in proximity to the presser roller in such position that a molded rand may be delivered between the corrugated roller and said presser roller. The shaft 216 is provided at one end with a pinion 218 which meshes with a gear 220 upon the upper roller shaft 38 so that rotary movement is imparted to the corrugated roller in a direction opposite to that of the presser roller. The shaft 216 is mounted in bearings 222 arranged upon opposite sides of the corrugated roller and secured upon the ends of rods 224 which are connected by a bar 226 and respectively received in sockets formed in a plate 230 that is bolted to the back plate of the machine. The lower end portions of the rods 224 are reduced in size so as to form shoulders Fig. 5 and springs 234 are respectively arranged upon said reduced end portions and have their upper ends in engagement with said shoulders and their lower ends in engagement with the bottoms of said sockets. With this construction it will be seen that the corrugated roller is yieldingly pressed toward the presser roller so that rands of different thicknesses may be pressed between said rollers and delivered from the molding mechanism. The lower reduced ends of the rods 224 extend through openings formed in the bottoms of the sockets and are provided with heads 236 adapted to engage the plate 230 and limit upward movement of the corrugated roller. A table 238 pivoted at one end upon the shaft 216 and provided with a flat upper surface is adapted to be held in an inclined rand-receiving position as shown in dotted lines in Fig. 5 by mechanism to be hereinafter described.

Arranged within a removable section 240 of the presser roller is a hook-shaped member 242, the hook of which is arranged to be automatically projected at a predetermined point in the rotation of said roller through an opening in said section and into a slot 244 in the matrix 200, which opens into the mold cavity at the center of its rounded end. Thereafter the hook-shaped member is moved so that it engages the rand upon the under surface of its rounded end and presses it in engagement with the presser roller. The rounded end of the rand being thus held in engagement with the presser roller, it will be seen that rotation of the presser roller will cause said rounded end to be carried between the corrugated roller and said presser roller, a slot 246 being formed in the corrugated roller at its central portion to permit the end of the hook-shaped member to pass therethrough in this movement of the presser roller.

After the rounded end of the rand has been held in engagement with the presser roller a sufficient time to insure its subsequent passage between the corrugated roller and the presser roller, the hook is arranged to release the rand and to be retracted within the opening in the section 240 of the presser roller. As shown upon the drawings the section 240 is recessed in its periphery to receive a cover plate 248 which is corrugated upon its outer side in order to more securely grip a rand that is fed to the rollers. According to a convenient construction a recess, formed in one of the side faces of the section 240, is arranged radially of the presser roller and is provided, as shown in Fig. 30, with a flat side 250 and flat edges 252 and 254. A slide 256 of less width than the recess is arranged with one of its sides in engagement with the flat edge 252 and a stud 260 carried by said slide extends into a slot 262 formed in the flat side 250. The hook-shaped member 242 is pivoted upon the stud 260 and is provided with gear teeth 262 which mesh with teeth 264 that are arranged upon the inner edge of a slide 266 which is formed to slide in the recess between the flat edge 254 and the slide 256. As shown in Fig. 29 of the drawings, the slide 266 has a portion, overlapping the slide 256, which is adapted to have sliding engagement with a marginal flange 268 formed upon the slide 256. The outer surfaces of the slide 266 and the marginal flange 268 are flush with the section 240 so that when said section is inserted within the opening in the presser roller lateral displacement of the slides is prevented by engagement of said slide 266 and said flange with a side of said opening.

A rod 270 is rigidly secured at its outer end to a bracket 272 carried by the frame of the machine, Fig. 2, and extends into an opening formed centrally of the roller shaft 38. Upon the inner end of the rod 270 are rigidly secured cam disks 274 and 276 which are respectively arranged for engagement with lugs 278 and 280 carried by the slides 256 and 266. A spring 286 having one end received within a socket in the slide 266 and its other end bearing against a plate 287 extending partly across the mouth of the recess in the section 240 tends to press the slide 266 toward the cam disk 276.

The cam disk 274 is so formed that normally in the rotation of the presser roller the slide 256 is held in its outer position in which the stud 260 engages the outer end of the slot 262 and the cam disk 276 is so formed that normally the slide 266 is held in its outer position so that the hook-shaped member is within the recess as shown in Fig. 6. As shown in Figs. 6 and 7 the contour of the cam disk 276 is further such that when in the rotation of the presser roller the hook-shaped member arrives at such position that it may be projected into the slot 244 of the matrix to engage the under surface of a rand in the cavity 202, the slide 266 is allowed to move inwardly under the influence of the spring 286 so that the hooked member is swung about the stud 260 through the medium of the intermeshing teeth 262 and 264 into a position in which its hooked end is beneath the rounded end of the rand in said cavity. The form of the cam disk 274 is such that after the hook-shaped member is swung into position in which its hooked end is beneath the rand the slide 256 is free to move inwardly and as further swinging movement of the hook-shaped member is now restrained the spring 286 moves the hook-shaped member 242 and slide 256 inwardly so that said hooked end yieldingly presses the rounded end of the rand against the presser roller. After the rounded end of the rand has been held a sufficient time in contact with the presser roller to insure its subsequent passage between the corrugated roller and said presser roller, the slides 256 and 266 are forced outwardly so that the hook releases the rand, the slide 266 being moved farther than the slide 256 so that the relative movement thus produced between the teeth 262 and 264 swings the hook-shaped member back to its original position within the recess. It will be noted in the construction shown that the hook-shaped member assists also in dislodging the molded rand from the mold cavity in the die roller.

The rand is fed by the corrugated roller and presser roller upon the table 238 when the latter is in the inclined position shown in dotted lines in Fig. 5. A transferrer 288 is arranged to automatically transfer the molded rand from the inclined table to a magazine 290 supported upon the top plate 212 of the machine. The transferrer is provided with a flat portion 292 integral with a plate 294 which is arranged in a plane at right angles to that of said flat portion and pivoted at its middle upon a stud 296 carried by a crank arm 298 secured upon the end of a horizontal shaft 300, Fig. 25. The shaft 300 is journaled within a horizontal tubular member 302 which carries a stationary segmental gear 304 arranged to mesh with a segmental gear 306 formed upon the plate 294. The tubular member 302 is clamped intermediate its ends within a split clamp 307 which is secured to the top plate of the machine.

With the above construction, it will be seen that swinging movement imparted to the transferrer about the shaft 300 will cause a simultaneous turning of the transferrer about the stud 296 through the agency of the stationary gear segment 304 and the segmental gear 306 carried by said transferrer. As indicated in Fig. 5, the above movement of the transferrer is such that it may be moved between a lower inclined position in which its flat portion 292 is directly over the top surface of a rand supported upon the inclined table 238, and an upper vertical position from which it may deliver a rand to the magazine.

Pivoted upon opposite sides of the flat portion 292 are arms 308 which are provided with bent ends 310 formed to grip and sustain a U-shaped rand between them by engagement with its opposite sides. The arms 308 are also provided upon adjacent faces with teeth 312 arranged to respectively mesh with teeth formed upon opposite sides of a rod 314 which extends between said arms and is slidingly mounted in a cylindrical opening arranged in the plate 294 longitudinally of said arms. A spring 316, having one end received in a socket formed in the rod 314 and its other end within a socket formed in the plate 294, yieldingly presses said rod so that the arms tend to approach each other. The arms 308 are automatically opened to release the rand and thus permit its delivery to the magazine by mechanism to be hereinafter described. A spring-pressed catch 318 pivoted intermediate its ends between ears extending from the plate 294 has a curved end 320 arranged to engage a notch 322 in the rod 314 so as to lock the arms in their open position. When the transferrer is in its rand-engaging position in which the flat portion 292 is directly over the top surface of a rand supported upon the table, the bent ends 310 of the arms are adapted to respectively project into marginal slots 324 that are formed in opposite sides of said table.

It will be seen that the provision of the slots 324 allows the bent ends of the arms to be moved toward each other by the spring 316 after the catch has been tripped to release said arms. The catch is tripped by mechanism automatically actuated by the upper roller so that the bent ends of the arms engage the rand. To this end a block 326 having an inclined cam surface is secured to the side face of the presser roller in such position that the cam surface is adapted to engage a roller 328 carried by one end of a lever 330 (Fig. 26) and impart a lateral swinging movement to the lever about a stud 332 which depends from the frame of the machine and pivotally sustains said lever at its middle portion. The other end of the lever 330 is arranged to engage a projecting end of the catch 318 in such manner that swinging movement imparted to the lever by the presser roller will trip the catch and thus allow the arms 308 to approach each other and grasp the rand.

After the rand has been engaged by the bent ends of the arms the table 238 is arranged to be automatically swung downward about its pivot out of the path of the transferrer in order that the latter may be free to swing the rand upwardly into the magazine. In the present machine a link 334, Fig. 25, has its upper end pivoted to an ear secured to the table at a portion adjacent its middle and its lower end pivoted to a crank arm 336 secured upon the end of a rock-shaft 338 that is journaled in a bearing 340 carried by the back plate of the machine. Upon the other end of the rock-shaft 338 is secured an arm 342 which carries a cam roller 344 that is held toward the roller shaft 52 by means of a spring 346 extending between said arm and the frame of the machine. A cam 348 secured to the roller shaft 52 is arranged to engage the cam roller 344 and raise the table into its upper position at the time that a rand is about to be delivered upon said table. As shown in Fig. 25, the form of the cam 348 is such that the table is held in its upper inclined position for a sufficient period of time to permit a molded rand to be advanced along the table to a position in which its sides may be gripped by the arms 308. After the arms 308 have gripped the rand in the manner previously described, the cam 348 has moved into such position that the spring 346 is free to move the table into its lower position in which it is removed from the path of the transferrer so that the latter may deliver the rand to the magazine.

To move the transferrer between its rand-receiving and rand-delivering position, a pinion 350 formed upon the end of the shaft 300 is arranged to mesh with a rack 352 that is pivoted at its lower end to one arm 354 of a bell-crank lever rotatably mounted upon the rock-shaft 338. The other arm 356 of the bell-crank lever is connected with one end of a link 358 which is adjustable in length and is pivotally secured at its other end to a crank arm 360 carried by the rock-shaft 104.

The above described mechanism for actuating the transferrer is constructed and arranged to move said transferrer into its rand-receiving position prior to the time that the table is raised into its upper position. This arrangement obviates any liability of interference between the transferrer and the table when said transferrer swings into its rand-receiving position. After the rand has been gripped by the arms 308 and the table has been moved into its lower position out of the path of the transferrer by the mechanism previously described the transferrer is swung upwardly into its rand-delivering position.

The magazine 290 which receives the U-shaped rands consists of a trough-shaped receptacle which comprises upper parallel rods 362 arranged to engage the opposite sides of the rands at points adjacent their flat ends and lower parallel rods 364 arranged to engage the opposite sides of the rands at points adjacent the middle of said sides, as shown in Figs. 2 and 5. The rods 362 and 364 are secured at each end to substantially U-shaped end members 366 which are mounted upon a rod 368 secured in a clamp 370 attached to the top plate of the machine. The magazine 290 is so arranged upon the top plate of the machine that when the transferrer is in its rand-delivering position the rand carried by it will be positioned in the end of the magazine with its sides in close proximity to the rods 362 and 364 so that when the arms 308 of the transferrer release the rand through the agency of the mechanism to be hereinafter described the sides of the rand will spring in engagement with said rods owing to the resiliency of said rand. After the rand has been released each of its sides has frictional engagement with one of the rods 362 and one of the rods 364 so that the rand is sustained in a substantially vertical position between said rods. A plate 372 is grooved upon its opposite sides to slide between the rods 362 and 364 and is constructed to offer frictional resistance to movement longitudinally of the magazine. The plate 372 is moved by hand toward the rand-receiving end of the magazine prior to the delivery of the first rand thereto. The first rand delivered to the magazine engages the plate and forces it back. As each rand is inserted in the magazine the previously inserted rand is pushed farther back, the plate 327 yielding to permit this movement, so that the rands accumulate in the form of a stack within the magazine. The sliding plate is of assistance in preventing displacement of the rands and also causes the rands to become closely packed within the magazine.

The magazine for opening the arms 308 of the transferrer to deliver a rand to the magazine is arranged to be automatically actuated from the presser roller. According to a convenient construction a projection 382, Figs. 2 and 27, extending from the top plate of the machine carries a horizontal stud 384 upon which one end of a lever 386 is pivoted. The lever 386 is held toward the top surface of the projection by a spring 388 and the free end of the lever 386 is arranged to extend partly under the lower end of the rod 314.

A pin 390 is mounted to slide in a vertical opening in the projection and is provided with a head, adapted to limit its downward movement, which is arranged beneath the lever 385. A block 392 secured to an end of the presser roller is provided with a cam surface arranged to lift the pin 390 immediately after the transferrer has reached its rand-delivering position. Since upward movement of the pin 390 is transmitted to the rod 314 by the lever 386 it will be seen that the arms 308 are moved apart to release the rand after the transferrer has been moved into its rand-delivering position. The arms 308 are held apart by the catch 318 until said catch is tripped to cause the arms to grip the next rand in the manner previously described.

Where rands are fed directly to the gripping means of the rand bending mechanism, as in the embodiment of the invention shown in Fig. 8, there is preferably provided means for assisting the operator in properly positioning the rand strip upon the carrier. For this purpose an arch-shaped member 394 is detachably secured to the front face of the bridge 146 by pins 396 which extend from said member and enter openings formed in the bridge in which they are secured by clamping screws 398. In the opposite ends of the arch-shaped member 394 are pivotally mounted vertical rods 400 to the lower ends of which are secured fingers 402 which normally extend toward each other transversely of the line of movement of the rand. The fingers are held in this position by means of torsional springs 404 which surround the rods 400, each of said springs having one end secured to said rods and its other end to the arch-shaped member. With this construction in feeding rands to the gripping means the rand is placed transversely of the carriage with its thick edge in engagement with the fingers so that the rand may be properly located longitudinally of the carriage. As the gripping means advances the rand the fingers yield inwardly to permit the movement of the rand.

A further feature of the invention is concerned with the provision of mechanism for assisting the operator in feeding rand strips to the rand bending mechanism. To this end there is provided a carrier which is arranged for movement between a receiving position, in which the operator may conveniently feed a rand strip to the carrier, and a position in which it automatically delivers the rand strip to the gripping means of the rand bending mechanism. Formed in the front end of the bed 68 upon opposite sides of the carriage 72 are rectangular openings in which substantially rectangular frames 406 are removably secured as shown in Figs. 3 and 9. Shafts 408, extending transversely of the carriage, are rigidly secured between opposite sides of each of the frames 406. The frame of the carrier consists substantially of side members 410, extending longitudinally of the carriage, and an arched end member 412 connecting said side members. The front ends of each of the side members 410 carry spaced ears 414 which are pivotally mounted upon the middle portions of the shafts 408.

Pinions 416, rigidly secured upon each of the shafts 408 between the ears 414, mesh with racks 418 that are respectively arranged in slots extending longitudinally in the side members 410. The rear ends of the racks 418 mesh with pinions 420 rigidly secured upon studs 422 rotatably mounted between ears 424 extending from the rear ends of the side members 410. With this construction it will be seen that swinging movement of the carrier about the shafts 408 will cause the racks 418 to move longitudinally to actuate the pinions 420, the movement of the carrier into its rand-delivering position, shown in full lines in Fig. 9, causing the pinions 420 to turn from left to right. The outer ends of the studs 422 have respectively a right and left hand threaded engagement with bushings 426 secured in the rear ends of the side members 410 whereby the swinging movement of the carrier into its rand-delivering position will cause the pinions 420 to recede from each other. Plates 428 extending longitudinally of the studs 422 are secured to each of the pinions 420 as by ears 430 secured to said plates and the sides of said pinions. The plates 428 are secured in such relation to the pinions that the inner portions of the plates may respectively rest upon opposite sides of the carriage when the carrier is moved into its rand-delivering position. The plates 428 carry means for sustaining a rand strip between them with its thick edge directed toward the rear of the machine. To this end clamps 432 are respectively held in yielding engagement with the upper surface of the plates 428 by spring-pressed pins 434 secured to the ends of said clamps and arranged in sockets formed in the plates. The pins 434 are provided with heads 436 adapted to engage the racks, as shown in dotted lines in Fig. 9, so that the clamps 432 are automatically moved into open position when the carrier swings into its receiving position. As shown upon the drawings, the free ends of the clamps 432 are bent away from the plates 428 to facilitate the insertion of a rand strip between said plates and clamps.

One of the side members 410 has rigidly secured to its front end a toothed disk 438 which is rotatably mounted upon the corresponding shaft 408. The toothed disk 438 is engaged by a gear segment 440 formed on the upper end of a lever 442 which is supported at its lower end for turning movement upon the rock-shaft 118. A rod 444, (Fig. 5,) pivotally connected at one end to the lever 442, carries on its other end a cam roller 446 which is held in engagement with a cam 448, carried by the lower roller shaft 52, by means of a spring 450 extending between the lever 442 and the frame of the machine. The end of the lever 442 which carries the cam roller is supported by a link 452 extending between said lever and a bar 454 that is sustained upon the shafts 104 and 118, the bar 454 being provided with an opening, through which the shaft 104 extends, and a semi-circular recess in its end which receives the shaft 118. The cam 448 is so formed that the spring 450 is allowed to hold the carrier in its rand-receiving position, shown in dotted lines in Fig. 9, during a period of time required for the die roller to make nearly one-half a revolution. The cam then swings the carrier into its rand-delivering position prior to the time that the gripping means engages the rand and thereafter the carrier is returned to its receiving position. In the construction described it will be seen that as the heads 436 of the pins are forced into engagement with the racks when the carrier is moved into its rand receiving position, as shown in dotted lines in Fig. 9, the clamps 432 are held in their outer positions so that the ends of a rand strip may be readily inserted between said clamp and the plate 428 in this position of the carrier.

In the operation of the machine, assuming the carrier is employed to feed the rand strips to the rand-bending mechanism, the treadle is depressed to start the machine and when the carrier has moved into its receiving position, shown in dotted lines in Fig. 9, the ends of a rand strip are placed between the clamps 432 and plates 428 so that the thick edge of the rand is directed toward the rear of the machine. The carrier then automatically moves toward its rand-delivering position and in this movement the plates 428 swing upwardly about the studs 422 so that the spring-pressed clamps 432 are free to hold the ends of the rand in engagement with the plates 428. In this movement also the pinions 420 recede from each other so that the plates 428 and clamps 432 are moved apart to stretch the rand longitudinally as it is being delivered to the rand-bending mechanism. When the carrier reaches its rand-delivering position, shown in full lines in Fig. 9, the rand is sustained transversely of the carriage with its middle portion resting upon the corrugations upon the slide and with its thick edge directed toward the rear of the machine. The gripper 84 then clamps the rand in engagement with the slide 80 and advances the rand toward the rear of the machine with its thick edge foremost. In this movement the rand passes under the front end of the presser and its thick edge engages the formers so that it is bent into a substantially U shape as it advances; the presser serving to prevent any upward distortion of the rand in the bending operation. The gripper then releases the rand and is retracted and thereafter the carriage is automatically advanced to deliver the rounded end of the rand to the rollers. As the rand is about to be delivered to the rollers the presser is automatically raised from engagement with the top surface of the rand. The rollers grip the rand between them and withdraw it from the rand-bending mechanism. In the modification shown in Figs. 13 and 14 the rear ends of the formers automatically approach each other to bend the two ends of the rand close together as said rand advances between the rollers.

In the embodiment of the invention shown in Figs. 15 to 18 inclusive the rear sections of the formers are stationary and serve to prevent the ends of the bent rand from spreading apart as said rand is being delivered to the rollers. After the rand has been delivered to the rollers the carriage is moved back to its original position. The bent rand is received in the die cavity in the lower roller so that as the rand passes between the rollers the corrugations which have formed in its inner or thin edge in the rand-bending operation are progressively smoothed out. Also by the provision of the die cavity in the lower roller the ends of the rands are prevented from springing apart in the molding operation. As the rounded end of the rand is fed between the presser roller and the die roller the hook-shaped member 242 is automatically actuated to press the rounded end of the rand in engagement with the presser roller. After the rounded end of the rand has been held in engagement with the presser roller a sufficient time to insure its subsequent passage between said roller and the corrugated roller 214, the hook-shaped member releases the rand and is retracted within the opening in the presser roller. The rand is fed by the presser and corrugated roller on to the table 238 when the latter is in the inclined position shown in dotted lines in Fig. 5 and the transferrer is in its rand-receiving position directly over the table. The arms 308 of the transferrer then grasp the rand and the table 238 swings down out of the path of the transferrer so that the latter is free to swing the rand up into the magazine. The transferrer then swings upwardly about the shaft 300 and at the same time has a turning movement about the stud 296 so that the molded rand is inserted in a substantially vertical position within the open end of the magazine. The arms 308 are then automatically opened by the presser roller so that the sides of the rands are free to spring into engagement with the sides of the magazine. As each rand is inserted in the magazine the previously inserted rand is pushed farther back, the plate 372 yielding to permit this movement so that the rands accumulate in the form of a stack within the magazine. The arms 308 are held in open position by the catch 318 in readiness to grasp the next rand that appears upon the inclined table 238. The transferrer is then swung down into its rand-receiving position and thereafter the table 238 is raised into its upper inclined position in readiness to receive the next rand delivered from the molding mechanism.

In the use of the modification shown in Fig. 8 where the rand strips are fed directly to the rand-bending mechanism the operator places the strip upon the carriage with its middle portion resting upon the corrugations upon the slide 80 and with its front edge in engagement with the fingers 402 so that the strip is properly positioned to be grasped by the gripping means.

By employing rand molding means independent of the bending means, the time necessary to form and mold a given number of rands is rendered much less than that required in previous machines in which the two means had elements in common. This is occasioned in particular by the fact that under the present invention the timing of the parts of the machine may be such that the rand molding mechanism may be molding a previously bent rand while the parts of the rand-bending mechanism are returning to their rand-receiving positions; and also the rand-bending mechanism may be bending a rand strip into a U-shaped rand while the parts of the molding mechanism are moving into position to receive said bent rand.

Although all the features of the present invention are herein shown as combined in one machine it is however possible to secure many of the advantages of the invention by employing some of its features without others, and machines having one or more of the features of this invention are considered to fall within the scope of the present invention.

It will be understood that although reference has been made herein to a U-shaped rand the present invention is not limited to machines adapted to act upon a strictly U-shaped rand. The rand may be of any shape that adapts it to readily conform to the heel of a boot or shoe in substantially the same manner as a strictly U-shaped rand, and where the expression "U-shaped rand" is employed in the claim it will be understood to mean any rand of a shape suitable to readily conform to the heel of a boot or shoe.

Having described my invention, what I claim as new and desire to secure by Letters Patent of the United States is:

1. A machine of the class described having, in combination, means for bending the edges of a rand strip together in the plane of the strip and mechanism independent of the said means for removing the bent rand and pressing out the corrugations formed upon its inner edge.

2. A machine of the class described, having in combination, rotary rand-molding means and rand-bending means independent of said molding means arranged to supply automatically a bent rand thereto.

3. A machine of the class described, having in combination, rand-molding means arranged to be continuously operated, and rand-bending means arranged to deliver a bent rand in timed relation to said molding means.

4. A machine of the class described, having in combination, rand-molding means arranged to be continuously operated and means for delivering a bent rand in timed relation to said molding means.

5. A machine of the class described, having in combination, rand-molding means arranged to advance a bent rand and constructed to progressively smooth out the corrugations upon the inner edge of the rand as it advances, and means for automatically delivering a bent rand to said molding means.

6. A machine of the class described, having in combination, rand-molding means constructed to progressively smooth out the corrugations upon the inner edge of a bent rand and means for delivering a bent rand to said molding means.

7. A machine of the class described, having in combination, rand molding means and independent means constructed to bend a rand strip into approximately U shape and thereafter advance the bent rand to a position in which it is received by said molding means.

8. A machine of the class described, having in combination, rand-bending means, a presser arranged to bear yieldingly upon the rand in the bending operation, rand-molding means arrangned to automatically withdraw the rand from said bending means and means for moving the presser away from the rand arranged to be actuated by said molding means prior to the molding operation.

9. A machine of the class described, having in combination, means for advancing a rand strip with its thick edge foremost, a carriage provided with means for engaging said edge at points intermediate its middle and ends, a presser mounted on the carriage and arranged to bear yieldingly upon the top surface of the strip as it advances, rand-molding means and automatic means for advancing the carriage to deliver the rand to said molding means.

10. A machine of the class described, having in combination, rand-molding means comprising coöperating rollers, one of said rollers having in its periphery a cavity formed to receive a bent rand, and means for bending a rand strip into a substantially U shape arranged to automatically deliver the bent rand to said rollers at such time that the rand is received within the said cavity.

11. A machine of the class described, having in combination, a carriage having a substantially flat surface to sustain a rand strip, means for bending said strip into a substantially U shape, rand-molding means and means for automatically advancing the carriage to deliver the bent rand to said molding means.

12. In a machine of the class described, rand-molding mechanism and rand-bending means having movable parts arranged in one position to permit a rand strip to be fed to the bending means and in a second position to permit the delivery of a bent rand to said molding mechanism, said parts being arranged to return to their original positions during the molding operation.

13. In a machine of the class described, rand-molding means including a pair of rollers and means for presenting the rounded end of a bent rand to said rollers.

14. In a machine of the class described, rand-molding means comprising a pair of rollers and automatic means for presenting the rounded end of a bent rand to said rollers.

15. In a machine of the class described, rand-molding means including a pair of coöperating rollers and means for sustaining a U-shaped rand by engagement with its straight side portions arranged to present the rounded end of said rand to said rollers.

16. In a machine of the class described, rand-molding means comprising a pair of coöperating rollers, means for advancing a rand strip toward said rollers with its thick edge foremost, means arranged for engagement with an edge of the strip to bend the ends of the strip toward each other in its advance movement and means for delivering the bent rand to said rollers.

17. A machine of the class described, having in combination, means for gripping a rand strip at a point adjacent its middle, formers positioned upon opposite sides of said gripping means and arranged to engage an edge of the strip and means for relatively moving said gripping means and formers to bend the ends of the strip toward each other.

18. A machine of the class described, having in combination, means for advancing a rand strip with its thick edge foremost and means positioned to be engaged by said edge for moving the ends of the strip toward each other as said strip advances.

19. A machine of the class described, having in combination, means for advancing a rand strip with its thick edge foremost and means for engaging said rand at points intermediate its middle and ends arranged to move the ends of the strip toward each other as said strip advances.

20. A machine of the class described, having in combination, means for gripping a rand strip, means for engaging an edge of said strip, said gripping and engaging means being constructed for relative movement and arranged to bend the ends of the strip toward each other during such movement and means for causing the movement of the rand to take place substantially within its own plane.

21. In a machine of the class described, means for bending a rand strip into a substantially U shape and means for insuring that the bending movement will take place substantially within the plane of the strip including a pivotally supported presser arranged to bear yieldingly upon the rand.

22. In a machine of the class described, means for advancing a rand strip in a direction transverse to its length with its thick edge foremost and means for engaging said edge arranged to bend the strip into a curved form as it advances.

23. A machine of the class described, having in combination, means for gripping a rand strip at a point adjacent its middle, arranged to advance said strip with its thick edge foremost and means for engaging said edge, arranged to bend the strip into a substantially U shape as it advances.

24. A machine of the class described, having in combination, means for gripping a rand strip at a point adjacent its middle, arranged to advance the strip with its thick edge foremost and means arranged for engagement with said edge formed to bend the strip progressively into a substantially U shape as it advances.

25. A machine of the class described, having in combination. means for automatically gripping a rand strip, and means for engaging an edge of said strip, said gripping and engaging means being constructed for relative movement and arranged to bend the ends of the strip toward each other during such movement.

26. A machine of the class described, having in combination, a support for a rand strip, means for automatically advancing the strip along said support with its thick edge foremost, formers positioned at opposite sides of said means and arranged to be engaged by the thick edge of the strip and means for moving said formers toward each other as the strip is advanced between them.

27. A machine of the class described, having in combination, a support for a rand strip, means for automatically advancing the strip along said support with its thick edge foremost, formers positioned upon opposite sides of said means and arranged to be engaged by an edge of the strip, a presser having an acting portion normally positioned between the formers and arranged to bear yieldingly upon the strip in the bending operation and means for successively raising the presser and moving opposite portions of the formers toward each other.

28. A machine of the class described, having in combination, a support for a rand strip, means for advancing the strip along said support with its thick edge foremost, formers positioned upon opposite sides of said means and arranged for engagement with said thick edge, a presser having an acting portion arranged to yieldingly bear upon the top surface of the rand as it advances between said formers and means for raising the presser to facilitate withdrawal of the rand.

29. In a machine of the class described, rand-bending mechanism comprising means for gripping a rand strip at a portion adjacent its middle arranged to advance said strip with its thick edge foremost and means for engaging said strip arranged to bend the strip into a substantially U shape as it advances, said gripping means being constructed to automatically release the bent rand to permit its discharge from said mechanism.

30. A machine of the class described, having in combination, a support to receive a rand strip, means for gripping the strip at a point adjacent its middle, formers positioned upon opposite sides of said gripping means and arranged for engagement with an edge of the strip, means for relatively moving said formers and gripping means to bend the ends of the strip toward each other, and means for pressing the strip against the support during the bending operation having acting parts positioned upon opposite sides of the gripping means and arranged to bear yieldingly upon the strip.

31. In a machine of the class described, the combination with a work supporting member having an approximately flat surface for sustaining a rand strip, of means for gripping the strip arranged for movement to advance the strip over said surface, said gripping means being constructed to grip the strip with a pressure proportionate to the resistance that is offered to the movement of the strip over said surface.

32. In a machine of the class described, a movable gripper constructed for engagement with one side of a rand strip, a second gripper for engaging the opposite side of the strip and means for moving one of said grippers to advance the rand having provision for imparting a relative approaching movement to the grippers with a force proportionate to the resistance that is offered to the forward movement of the rand.

33. In a machine of the class described, a gripper for engaging one side of a rand strip, a second gripper for engaging the opposite side of said strip, means for imparting an advance movement to the second gripper, means for moving the second gripper toward the first gripper as it advances to clamp the rand, and means for resisting the movement of said second gripper.

34. In a machine of the class described, a gripper for engaging one side of a rand strip mounted for movement in a predetermined path, a second gripper for engaging the opposite side of the strip, means for successively imparting a forward and a rearward movement to the second gripper along the line of movement of the first gripper, and means for moving the second gripper toward the first gripper in said advance movement to clamp the rand constructed to impart a relative separating movement to the grippers in said rearward movement.

35. In a machine of the class described, rand-molding means comprising coöperating rollers, one of said rollers having in its periphery a rand-receiving cavity progressively increasing in depth from its middle portion to its edges.

36. In a machine of the class described, rand molding means comprising a pair of coöperating rollers rotatable about different axes, one of said rollers being provided with a rand receiving cavity in its periphery constructed to allow the thin edge of a rand within the cavity to be subjected to the molding action of the rollers as said rand is advanced between said rollers.

37. In a machine of the class described, rand molding mechanism comprising a die and a presser operating progressively from the rounded portion of a U-shaped rand toward its two ends to smooth out the corrugations upon the inner edge of the rand.

38. In a machine of the class described, rand molding mechanism, comprising a die and a presser acting progressively from the middle of the rand to the ends to smooth out the corrugations upon the inner edge of a bent rand by a yielding pressure.

39. In a machine of the class described, means for molding a bent rand comprising a pair of coöperating rollers, one of said rollers being provided with a die block removably secured therein and having a die cavity formed to prevent the ends of a bent rand from springing apart as it is fed between said rollers.

40. In a machine of the class described, rand molding mechanism, comprising a plurality of rollers rotatable about different axes, arranged in coöperative relation to each other and provided with means for preventing the ends of a bent rand from springing apart in the molding operation.

41. A machine of the class described, having in combination, a presser roller and a die roller, arranged to coöperate in molding a bent rand, an auxiliary roller arranged in proximity to said presser roller and means carried by one of said rollers for insuring the discharge of the molded rand between said auxiliary roller and said presser roller.

42. A machine of the class described, having in combination, a pair of rollers arranged to coöperate in molding a strip of stock, an auxiliary roller arranged in proximity to one of the rollers and means carried by one of said rollers for insuring the discharge of the molded strip between said auxiliary roller and one of said rollers.

43. A machine of the class described, having in combination, a pair of rollers constructed and arranged to coöperate in molding a strip of stock and means carried by one of said rollers for controlling the path of the strip in its discharge from said rollers.

44. A machine of the class described, having in combination, a presser roller and a die roller constructed and arranged to coöperate in molding a bent rand and means carried by one of said rollers for dislodging the molded rand from said die roller.

45. A machine of the class described, having in combination, a support having a flat rand receiving surface, rand molding means constructed to discharge a molded rand upon said support, a magazine and means for automatically transferring the molded rand from said support to said magazine.

46. A machine of the class described, having in combination, mechanism for operating upon rands, a magazine for receiving the finished rand comprising an open-ended trough-like receptacle and a transferrer arranged to automatically grasp a finished rand and insert it within the open end of the magazine and constructed to automatically release the rand after the latter is received within the magazine.

47. A machine of the class described, having in combination, mechanism for operating upon rands, a magazine for receiving the finished rands comprising an open-ended, trough-like receptacle and a transferrer arranged to automatically grasp a finished rand and insert it within the open end of the magazine, with its sides in close proximity to the sides of said magazine and constructed to release the rand automatically after it has been placed in the above position.

48. A machine of the class described, having in combination, mechanism for operating upon rands, a magazine for receiving the finished rands comprising an open-ended, trough-like receptacle, automatic means for successively inserting the finished rands within the open end of said magazine and means for preventing displacement of the rands in said magazine.

49. A machine of the class described, having in combination mechanism for operating upon rands, a magazine to receive the rands and means for receiving a rand from said mechanism arranged to automatically deliver the rand to said magazine.

50. In a machine of the class described, a magazine and mechanism for operating upon rands provided with means for delivering a finished rand to said magazine.

51. In a machine of the class described, the combination with mechanism for operating upon rands, having movable gripping means for receiving a rand strip, of a carrier arranged to automatically deliver a rand strip in timed relation to said gripping means.

52. In a machine of the class described, the combination with mechanism for operating upon rands, having means for gripping a rand strip at a point adjacent its middle, of carrier provided with automatic means for yieldingly grasping a rand strip at its two ends arranged to deliver said strip in timed relation to said gripping means.

53. In a machine of the class described, the combination with mechanism for operating upon rands, of a carrier provided with automatic means for gripping a rand strip at its opposite ends, said carrier arranged to deliver the strip to said mechanism, said gripping means being arranged to recede from each other as said carrier moves into its delivering position.

54. In a machine of the class described, the combination with mechanism for operating upon rands, of a carrier arranged for movement between a position in which it may receive a rand strip and a position in which it delivers said strip to said mechanism and means carried by the carrier for gripping a rand strip at its two ends arranged to automatically open and close in timed relation with the movement of said carrier.

55. In a machine of the class described, the combination with mechanism for operating upon rands, of a carrier arranged for movement between a position in which it may receive a rand strip and a position in which it delivers said strip to said mechanism and means carried by the carrier for gripping a rand strip at its two ends arranged to be automatically opened and closed by the movement of said carrier.

56. In a machine of the class described the combination with rand bending means of a movable carrier arranged to receive a strip of stock and to deliver it automatically to said bending means and constructed to stretch said strip longitudinally as it moves from rand receiving to rand delivering position.

57. In a machine of the class described, the combination with rand bending means of a movable carrier arranged to deliver a rand automatically to said means.

58. In a machine of the class described the combination with rand bending means of a movable carrier constructed to receive a strip of stock and to grasp the strip automatically when moved away from receiving position and arranged to deliver said strip automatically to said bending means.

59. In a machine of the class described, a gripper for engaging one side of a rand arranged for movement in a predetermined path, a second gripper for engaging the opposite side of the rand and means for advancing the second gripper along the line of movement of the first gripper constructed to cause said second gripper to approach the first gripper in said advance movement.

60. A machine of the class described, having in combination, rand molding mechanism and independent means for advancing bodily a rand strip constructed to bend it into an approximately U shape as it advances, said means being arranged to deliver the bent rand to said molding mechanism.

61. A machine of the class described, having in combination, rand molding means and independent mechanism for advancing a rand strip in the plane of the strip having provision for bending the strip into an approximately U shape as it advances, said mechanism being arranged to automatically deliver the bent rand to said molding means.

62. In a machine of the class described, the combination with rand bending means, of a movable carrier constructed to sustain a rand strip by engagement with its two ends and arranged to deliver the strip automatically to said means.

63. A machine of the class described, having in combination, rand molding means, a member having a flat rand receiving surface, mounted for movement in a predetermined path but normally arranged in position to receive a molded rand delivered from said molding means, a magazine, a transferrer constructed to grip a rand upon said surface and arranged for movement in a path intersecting the path of said member to deliver the rand automatically to said magazine and means for automatically actuating said member to move it out of the path of the transferrer prior to the movement of the latter on its way to the magazine.

In testimony whereof I have signed my name to this specification in the presence of two subscribing witnesses.

ELIPHALET A. TRIPP.

Witnesses:
ALLAN H. BARROWS,
BERNARD BARROWS.

Copies of this patent may be obtained for five cents each, by addressing the "Commissioner of Patents, Washington, D. C."

It is hereby certified that in Letters Patent No. 1,115,037, granted October 27, 1914, upon the application of Eliphalet A. Tripp, of Beverly, Massachusetts, for an improvement in "Machines for Shaping Rands," errors appear in the printed specification requiring correction as follows: Page 9, line 65, for the reference-numeral "327" read *372;* same page, line 72, for the word "magazine" read *mechanism;* same page, line 89, for the reference-numeral "385" read *386;* and that the said Letters Patent should be read with these corrections therein that the same may conform to the record of the case in the Patent Office.

Signed and sealed this 19th day of January, A. D., 1915.

[SEAL.] R. F. WHITEHEAD,

*Acting Commissioner of Patents.*